(12) United States Patent
Wong et al.

(10) Patent No.: US 12,090,637 B2
(45) Date of Patent: Sep. 17, 2024

(54) ADAPTABLE MULTIFUNCTION ROBOTIC HANDS

(71) Applicant: VIRALINT PTE LTD, Singapore (SG)

(72) Inventors: Soon Wei Wong, Singapore (SG); Kundapura Parameshwara Srinivas, Singapore (SG)

(73) Assignee: VIRALINT PTE LTD, Singapore (SG)

(*) Notice: Subject to any disclaimer, the term of this patent is extended or adjusted under 35 U.S.C. 154(b) by 190 days.

(21) Appl. No.: 17/465,534

(22) Filed: Sep. 2, 2021

(65) Prior Publication Data
US 2022/0063111 A1 Mar. 3, 2022

(30) Foreign Application Priority Data

Sep. 3, 2020 (SG) .............................. 10202008588S

(51) Int. Cl.
| | | |
|---|---|---|
| *B25J 15/00* | (2006.01) | |
| *B25J 9/16* | (2006.01) | |
| *B25J 11/00* | (2006.01) | |
| *B25J 13/08* | (2006.01) | |
| *B25J 15/02* | (2006.01) | |
| *B25J 15/04* | (2006.01) | |
| *B25J 15/06* | (2006.01) | |

(52) U.S. Cl.
CPC ......... *B25J 15/0009* (2013.01); *B25J 9/1697* (2013.01); *B25J 11/0085* (2013.01); *B25J 13/082* (2013.01); *B25J 15/0019* (2013.01); *B25J 15/0206* (2013.01); *B25J 15/0475* (2013.01); *B25J 15/0616* (2013.01)

(58) Field of Classification Search
CPC .................. B25J 15/0009; B25J 15/0019; B25J 15/0052; B25J 1/0061; B25J 15/0066; B25J 15/0475; B25J 9/1697; B25J 11/0085; B25J 13/082; B25J 19/021; B25J 19/023
See application file for complete search history.

(56) References Cited

U.S. PATENT DOCUMENTS

| | | | | |
|---|---|---|---|---|
| 7,549,688 B2 * | 6/2009 | Hayakawa | ............. | B25J 9/0009 294/902 |
| 8,936,290 B1 * | 1/2015 | Salisbury | ............. | B25J 15/0009 294/111 |
| 9,539,728 B2 * | 1/2017 | Nammoto | ............ | B25J 15/0009 |

(Continued)

FOREIGN PATENT DOCUMENTS

| CN | 1964822 A | 5/2007 |
|---|---|---|
| CN | 104802181 A | 7/2015 |

(Continued)

*Primary Examiner* — Dean J Kramer
(74) *Attorney, Agent, or Firm* — Mannava & Kang, P.C.

(57) ABSTRACT

Toolable modules, each having a set of functions and capabilities which are configurable to function cooperatively, to create a set of Robotic arms. Each finger of the module enables a specific task to be accomplished, providing multiple degrees of movements, enabling the Robotic arms to be deployed in highly precise applications and capable of responding to complex tasks. In coordination with an imaging system and a control system the functionality of the Robotic arms are programmable, scalable and configurable in addition to being able to communicate with the external interfaces in a predetermined protocol, thereby providing "Plug and Play" functionality.

13 Claims, 4 Drawing Sheets

(56) References Cited

U.S. PATENT DOCUMENTS

| 9,616,580 B2* | 4/2017 | Smith ................... B25J 13/086 |
| 2007/0035143 A1 | 2/2007 | Blackwell et al. |
| 2014/0197652 A1* | 7/2014 | Wang .................. B25J 15/0009 |
| | | 294/185 |
| 2019/0168396 A1* | 6/2019 | Leidenfrost ........... B25J 9/1697 |

FOREIGN PATENT DOCUMENTS

| CN | 106625734 A | * | 5/2017 | .......... B25J 15/0009 |
| JP | 2014151371 A | | 8/2014 | |
| JP | 2016203264 A | | 12/2016 | |
| WO | 2010131605 A1 | | 11/2010 | |
| WO | 2019175675 A2 | | 9/2019 | |

\* cited by examiner

ADAPTABLE MULTIFUNCTION ROBOTIC HANDS

PRIORITY

The present application claims priority under 35 U.S.C. 119(a)-(d) to Singaporean Patent Application number 102020085885, having a filing date of Sep. 3, 2020, the disclosure of which is hereby incorporated by reference in its entirety.

FIELD OF THE INVENTION

The present invention relates to an apparatus and method for handling objects using a set of Multifunction Robotic hands that are interconnected, with each finger unit designed as an interchangeable tool that is capable of handling and executing specific tasks. The Robotic hands are operated using computer control systems with built-in Artificial Intelligence enabling the apparatus to learn and improve upon the process of executing repeated tasks. The present invention, more specifically relates to a system and method to manipulate the finger units and palms of the Multifunction Robotic hands to perform delicate tasks such as opening container lids or caps, peeling the top cover of the contact lens package, picking up and positioning the ophthalmic or contact lens onto pedestal for the imaging system to inspect and determine the characteristics of the lens and unloading and sorting the inspected lens based on the characterized result. With additional options to Clean the lens containers with hot or cold deionised air, brushing the object or its container, dispensing saline liquid or other types of solutions at controlled speed, the Robotic hands provides a versatile system for deployment in a typical quality control process for the ophthalmic lens manufacturing industry.

BACKGROUND OF THE INVENTION

Some automated tasks, especially those in which there are interactions between delicate and sensitive objects, require the collaborative work of multiple finger units in a Robotic hand equipped with end-effector grippers. With flexible degrees of movements and built-in features for cleaning, pickup and placement of objects, Liquid dispensing, Gripping and rotating and sterilising features the Robotic hands are specially suited for operating in environments not suitable for deployment of humans for performing various tasks. Most of the current disclosed art attempting such tasks require multiple stages of manual inspection or human intervention and the use of multiple mechanical manipulators to perform the task with a high possibility of errors being introduced during the process. Prior art limitations include dedicated manipulators mounted on separate platforms, time consuming reconfiguration process before they are deployed in manufacturing or quality control process.

Humanoid robots may be preferred when direct interaction is required with devices or systems that are specifically made for human interaction with capabilities to communicate in a local or common spoken language. Where audio commands and understanding audio instructions are not required, humanoids are an overkill and also occupy a significant amount of space. Moreover if physical movements of the Robots to multiple locations is not required, humanoids are not preferred due to space constraints and safety issues involved.

SUMMARY

The implementation of the multifunction Robotic hands is an important step towards a space saving and efficient system for handling objects such as a soft contact lens or ophthalmic lens. In this invention the interest is to switch from manual manipulation of manufactured objects with non-dexterous grippers to high-dexterity Robotic hand manipulation, where the degree of dexterity is selected according to the kind of task to be performed, in particular, the design of a hand for a set of tasks performed during quality control management is explored by designing two Robotic hands with at least five finger units for inspecting contact lenses with the aid of an intelligent AI based imaging system and subsequently sorting them according to their characterized categories to preassigned bottles or containers.

In this invention, a pair of highly dexterous multi-fingered Robotic hands is proposed in cooperation with an imaging system, that is able to perform the task of unloading a contact lens suspended in a saline solution in a blister package, to perform quality inspection of the contact lens, after gently peeling off the foil covering the contact lens holder or blister pack and subsequently sorting the lens into different containers based on the characteristics determined by the imaging system. Each finger unit in the pair of Robotic hands, is dedicated to at least a single task that includes but not limited to peeling the cover foil using a motor, unloading the contact lens from the lens holder to the inspection station, emptying and cleaning the contents of the lens holder, dispensing saline or other liquids (when required) and unloading and sorting the inspected lens and additional tools mounted in the palm area of the Robotic hands for loosening or tightening a container cap, a miniature camera for fine alignment of the object or the tools and a pedestal to position the object for inspection.

According to the first aspect of the invention, the Multifunction Robotic hand assembly includes a base structure connected to the hand structure mounted with at least five fingers. The fingers are operatively connected to the base structure electrically, pneumatically and liquid dispensing tubes in a known combination to aid interchangeability of Robotic hands for performing different tasks.

Another aspect of the invention is directed to a pair of Multifunction Robotic hands including a finger unit combining the thumb and the index finger to grasp small objects such as a Contact lens blister package to enable another Robotic hand mounted with a Rotary motor, to engage the shaft of the motor with the edge of the blister foil covering the package and to peel off the foil using Rotary motion. Each of these Robotic fingers are controlled by a control system that networks to an imaging system to aid in detecting, locating and moving the object to be inspected by an imaging system. The details of the imaging system and its related illumination module and control system is not discussed as it is outside the scope of this invention.

Another aspect of the invention is directed to the Multifunction Robotic right hand that includes a finger suitably integrated with an anti-static suction pad to pick up the contact lens from a lens holder, move the contact lens to a platform or pedestal for inspection. Another Robotic finger suitably integrated with an Air jet valve to blow hot or cold air or any other type of non-toxic gas for the purpose of cleaning and sterilizing the object and object holder. Another finger suitably integrated with non-static brush aids in cleaning and a subsequent finger incorporated with a Solution dispenser performs the task of dispensing liquid, Another finger is integrated with a miniature motor that works to perform tasks involving Rotary movement as and when required. For eg: to engage the motor shaft to the blister foil to peel it off from the lens holder or a container.

Another aspect of the invention is directed towards a set of Robotic hands that are interchangeable with every finger assigned to a particular task.

Another aspect of the invention is directed towards at least one finger of the Robotic hand integrated with a motor with positional feedback via encoders, to enable a section of the finger, to be rotated by a specific angle for achieving multiple orientations.

Another aspect of the invention is directed towards at least one finger of the Robotic hand incorporated with antistatic pressure sensors to enable delicate and static sensitive objects to be safely handled at different stages of the process flow.

Another aspect of the invention is directed towards motorized or pneumatic X-Y displacement mechanisms with built-in encoders, mounted on at least one finger of the Robotic hand to enable fine positioning of objects with positional feedback.

Another aspect of the invention is directed to a Robotic apparatus that includes a Rotary motor with built-in encoders, suitably integrated into the palm of the Robotic hand. combined with a gripping manipulator to enable loosening or tightening of nuts, bolts, caps and lids of containers.

Another aspect of the invention is directed to the pair of Robotic hands, which are mounted with proximity sensors and suitably positioned infrared (IR) sensors for the purpose of collision avoidance when executing various tasks.

The invention enables the implementation of a Multifunction Robotic hands to manipulate objects with various degrees of movement with the added capability of easily interchanging the tasks of the individual fingers and hands without expensive and time consuming modifications to the setup to perform delicate tasks especially when the workplaces are toxic, dirty, oily and sensitive to static charges.

Other manufacturing applications where the present invention may be deployed include Mobile phone glass inspection for defects, manufacturing of Coronary artery bypass grafting and Angioplasty accessories, in operating theatres during surgery, sorting and binning in Warehousing and Postal Services.

Persons skilled in the art will appreciate that other arrangements of the invention are possible, and consequently the particularity of the accompanying drawings is not to be understood as superseding the generality of the preceding description of the invention.

BRIEF DESCRIPTION OF DRAWINGS

The above features and advantages of the present invention are readily apparent from the following detailed description of the best modes for carrying out the invention when taken in connection with the accompanying drawings, in which.

DETAILED DESCRIPTION OF DRAWINGS

Figure 1:
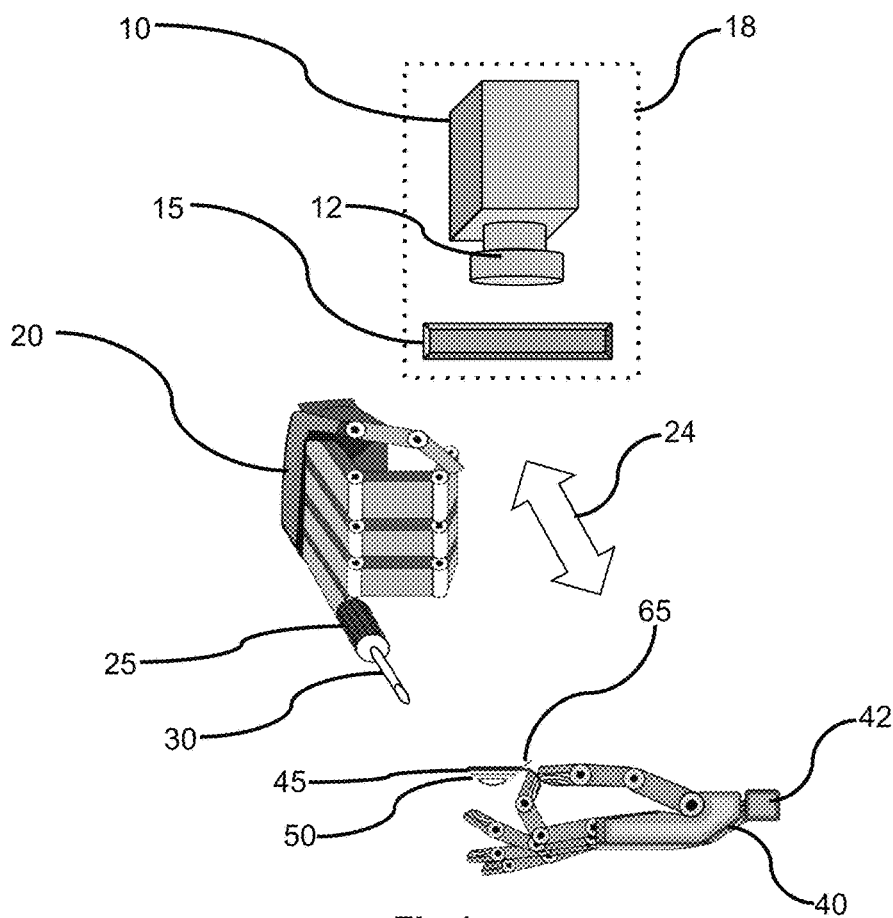
FIG. 1 shows a configuration of the present invention according to a first embodiment.

Hereinafter, a Multifunction Robotic hands, interchangeable Robotic finger units and a Robotic device according to exemplary embodiments of the invention will be described referring to the accompanying drawings, it is important to note that the same reference numerals are given to the same or like members and parts in the different drawings, As shown in FIG. 1, the Multifunction Robotic Hands 20 and 40 according to the first embodiment includes five finger units in each hand. A miniature motor 25 is integrated into the little finger unit of the Robotic Right hand 20 with interchangeable shafts 30. The second Multifunction Robotic hand 40, functions as a manipulator to locate and position objects under the imaging system 18 comprising a Camera 10, optical lens 12 and illumination module 15. The Robotic hands are designed to be quickly interchangeable through snap-on polarised connectors 42 as shown in FIG. 1 for the Robotic left hand 40.

The dual Multifunction Robotic hands together with the imaging system operate in synchronization to perform complex tasks in different environments. Due to their hermetically sealed design, the Multifunction Robotic hands may be deployed in clean rooms, toxic, hot or humid workplaces, operating theatres for surgical procedures, humanoids, food packing industry, Pharmaceutical and Glass industries to name a few.

The system and method illustrated in FIG. 1 relates to peeling the blister foil 65 from the Contact lens holder 50 without any human interaction, wherein the Robotic left hand 40 is used for grasping the object (for egg the Contact lens container 50) and positioning it under the imaging system camera 10. The imaging system 18 detects the edge of the blister foil 65 and communicates the location to the Robotic Right hand 20 which moves the Motor shaft 30 to engage the blister foil 65 of the blister pack 50 held by the Multifunction Robotic left hand 40.

Figure 2:
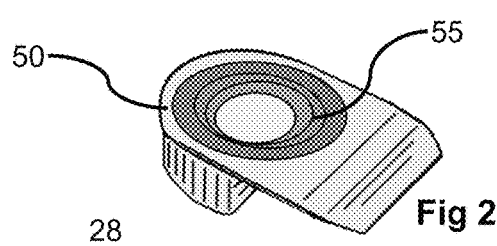
FIG. 2 is an isometric view of a typical empty contact lens blister pack.

FIG. 2 is an empty blister shell 50 without a blister foil covering the package.

Figure 3:
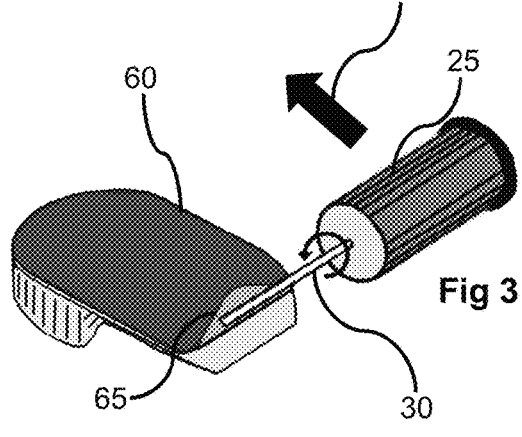
FIG. 3 is an isometric view of a hermetically sealed blister package containing a contact lens with the Robotic Right hand motor shaft engaged with the edge of the blister foil.

FIG. 3 is an isometric view wherein the Motor shaft 30 of the motor 25 has engaged with the edge of blister foil 60 at the location 65. As earlier explained the motor is suitably integrated to the little finger of the Multifunction Robotic Right hand and with the aid of the imaging system 18 in FIG. 1, accurately engages with the blister foil edge 65, before the shaft 30 in FIG. 3 is energised to rotate in the clockwise direction or the peeling direction while synchronously moving the Multifunction Robotic Right hand in the direction 28 and in the process peel the blister foil from the Top surface of the blister pack or Shell 50.

Figure 4:
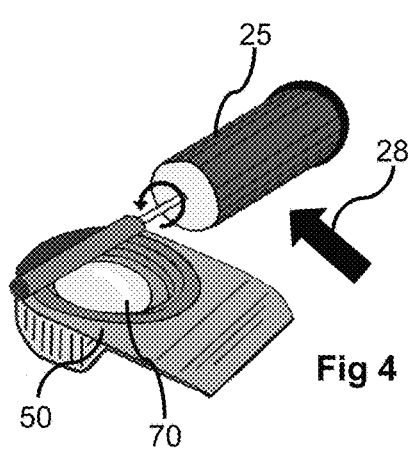
FIG. 4 is an isometric view of a blister package with its blister foil peeled exposing the contact lens.

FIG. 4 shows how the process of peeling the blister foil that has been partially completed with the contact lens 70 exposed, with the motor 25 positioned at the opposite end of the blister pack. In the next step (not shown), the motor 25 continues to rotate the shaft 30 until the blister foil 60 is completely detached from the blister pack 50 and subsequently discarded.

Figures 5, 5A:
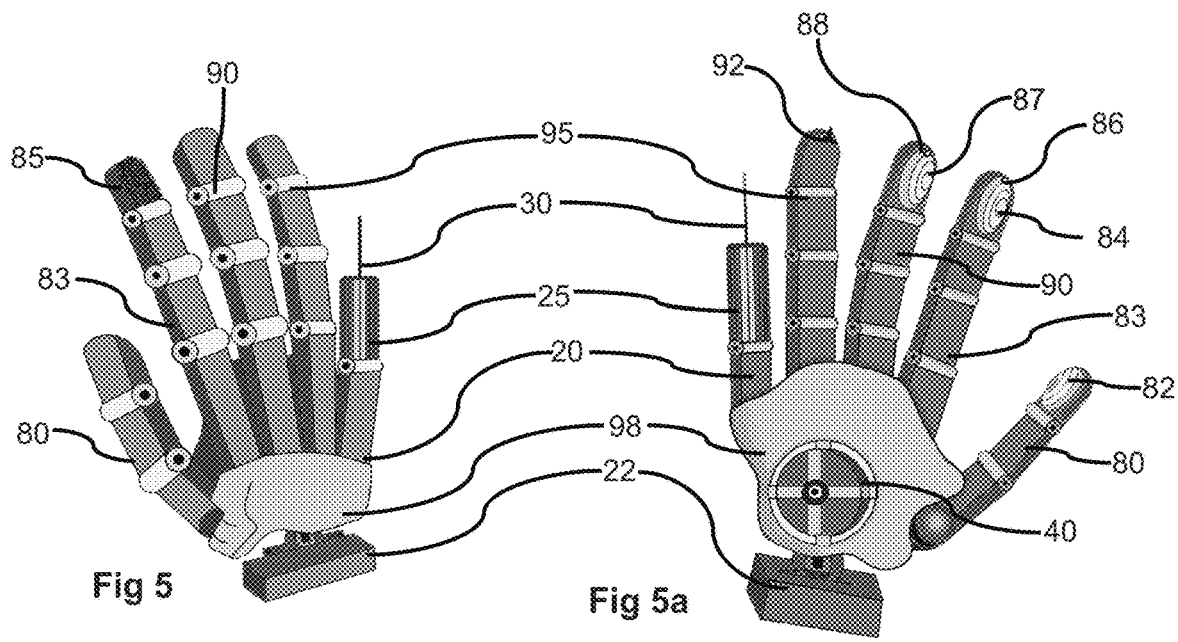
FIG. 5 is a perspective view of the Multifunction Robotic Right back hand according to the first embodiment.
FIG. 5a is another perspective view of the Multifunction Robotic Right Front hand (showing the palm) according to the first embodiment.

FIGS. 5 and 5a shows a perspective view of the Multifunction Robotic Right Hand from the back and front respectively according to the first embodiment of the present invention, and includes five finger hermetically sealed units, the thumb 80, the first or index finger unit 83, second or middle finger unit 90, third or Ring finger unit 95 and the fourth or little linger unit 20. A support section 98 drives the five finger units and interconnects to the external interfaces via drive section 22. External interfaces may include a humanoid arm, or an automated manipulator to name a few. Commands received at the interface is subsequently communicated to the support section 98 to manipulate the five finger units and their respective features such as motors, air jets, brush, solution dispenser, X&Y displacement drives, Bottle openers and to monitor a host of sensors incorporated in the fingers to read pressure, temperature, positional data. Section 22 through a unique interlocking interface to the external control system, aids in channelling the pneumatics, electrical and bidirectional computer interface for communication of the Robotic Right hand. It is suitably designed for easy interchangeability, adaptability and scalability.

The five finger units in the first embodiment of the present invention are designed with specific features such as tactile sensors, Hall effect sensors, Pressure sensors and gauges to apply them different tasks. The Robotic finger units are also modularly designed with standardised interface for mechanical, Electrical and Pneumatic control, to enable the Robotic hand to be quickly reconfigured for different applications.

According to the first embodiment of the present invention and referring to FIG. 5a, the thumb 80 is designed with a rubber adapter 82 wherein the surface is rough but soft to enable it to grip objects. The Robotic Right hand index finger unit 83 in addition to the rubber gripper 84 and an opening 86 to dispense a solution through an electrically controlled valve (not shown) on one side, is also integrated with a brush 85 (FIG. 5) on the other side, to aid in cleaning and brushing of an object. The middle finger unit 90 consists of a rubber gripper 87 and an opening 88 to blow clean and deionised air through an electrically controlled pneumatic valve (not shown) to enable cleaning and drying of an object. The Robotic Right hand ring finger unit 95 is integrated with a Suction cup 92 suitable for picking up objects from a predetermined location and placing them at multiple locations. The little finger unit 20 is incorporated with a miniature motor 25 with an interchangeable shaft or tool 30 to perform multiple tasks. A rotary gripper 40 is integrated in the palm area of Robotic Right hand 98 that may be utilised to loosen or tighten screws, nuts and caps from bottles or any other task that requires Gripping and Rotational movement.

Figure 6:
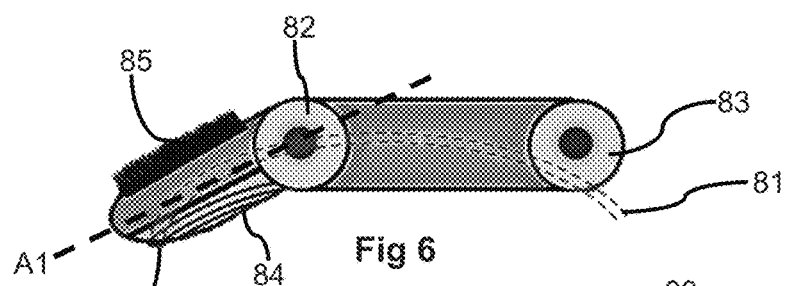
FIG. 6 is a side view of the Multifunction Robotic Right hand index finger unit according to the first embodiment.

FIG. 6 is a side view of the Robotic Right hand index finger unit 83. As illustrated, the tip of the index finger unit is incorporated with a Rubber pad 84 made from flexible resin, a small opening 86 for spraying a fine jet of solution through a tube 81 for cleaning purposes and a brush 85 for scrubbing the object. The jet is controlled by a computer triggered valve (not shown). The fingertip of the index finger unit 83 is designed to be rotatable around the joint 82 along the axis A1 to enable the brush 85 to be turned 180 degrees from its original position.

Figure 7:
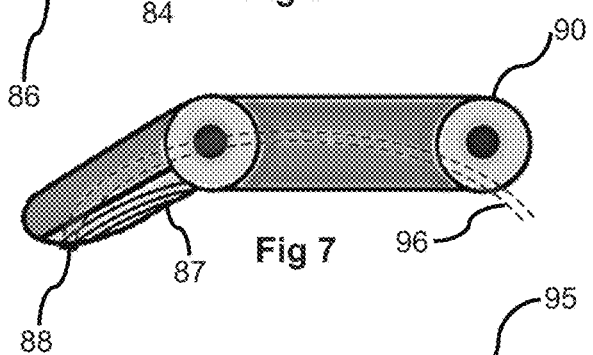
FIG. 7 is a side view of the Multifunction Robotic Right hand middle finger unit according to the first embodiment.

FIG. 7 is a side view of the Robotic Right hand middle finger unit 90. As shown, the tip of the middle finger unit is also incorporated with Rubber pad 87 made from flexible resin and a small opening 88 connected to an air jet valve (not shown) through a pneumatic tube 96. The air jet may be controlled to deliver deionised hot or cold air to the object for removing any static charge and to also clean and dry the object before the next process step.

Figure 8:
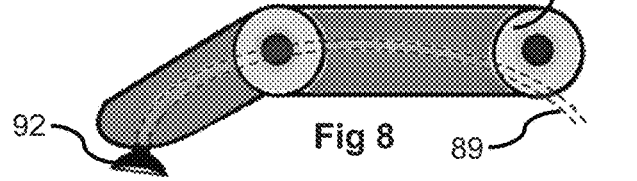
FIG. 8 is a side view of the Multifunction Robotic Right Ring finger unit according to the first embodiment.

FIG. 8 is a side view of the Robotic Right hand ring finger unit 95. It is used to pick up an object using a suction pad 92 whenever an object needs to be moved to another location. For eg: The Ring finger unit 95 may pick up a contact lens 70 in FIG. 4 using the suction cup 92 in FIG. 8 and place it on the pedestal 44 in FIG. 11 before the Robotic left hand in FIG. 11 position itself suitably under the imaging system 18 in FIG. 1 for contact lens inspection and subsequently presenting itself to the Robotic Right hand finger unit 95 in FIG. 8 for the contact lens 70 to be picked up from the pedestal 44 in FIG. 11 and placing it at another location such as a container or tray. The suction pressure is created at 92 in FIG. 8 through the tube 89 via a computer controlled valve (not shown).

Figure 9:
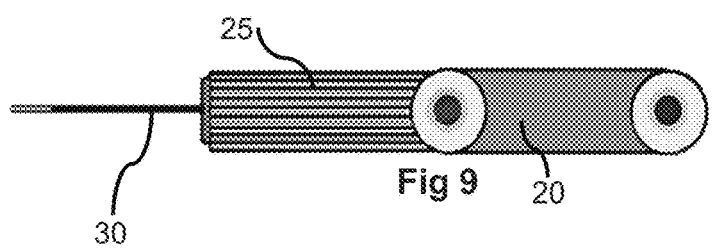
FIG. 9 is a side view of the Multifunction Robotic Right hand little finger unit according to the first embodiment.

In FIG. 9, a side view of the Robotic Right hand little finger unit 20 shows a miniature motor 25 suitably integrated to the base. An interchangeable rotor or tool bit enables multiple tasks to be accomplished.

Figure 10:
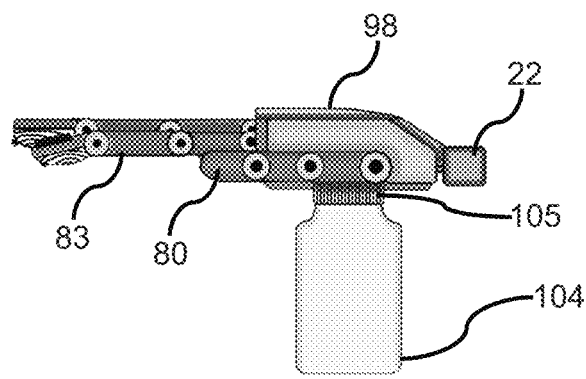
FIG. 10 is a perspective view of the Multifunction Robotic Right hand according to the second embodiment.
Figure 11:
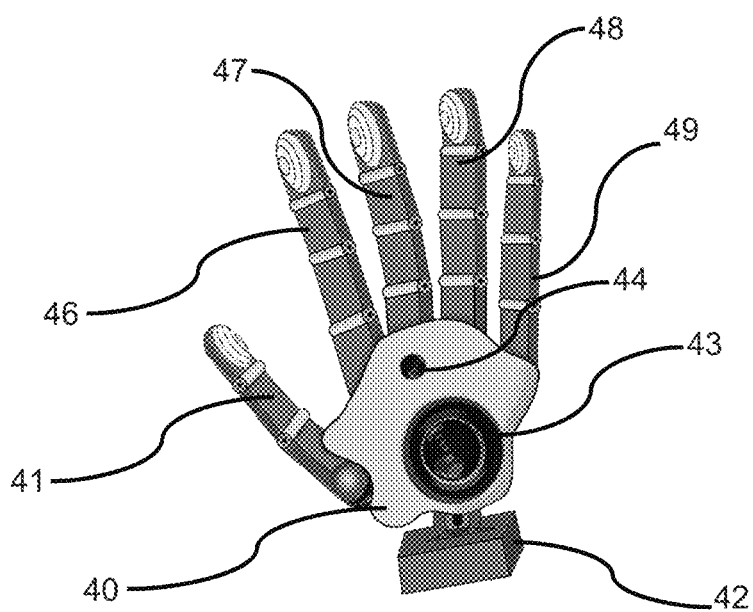
FIG. 11 is another perspective view of the Multifunction Robotic left hand according to the first embodiment.

In a second embodiment of the present invention FIG. 5a illustrates a configurable bottle opener 40 which is suitably integrated into the palm area of the Multifunction Robotic Right hand, that provides Rotary action in both clockwise and anti-clockwise direction, combined with force and Torque control to enable bottle caps to be loosened or tightened. The design of the bottle opener 40 is such that it caters to different and multiple forms of bottle cap profiles. The Bottle cap opening method is illustrated in FIG. 10 wherein the bottle cap 105 of bottle 104 is engaged with the Rotary fixture 40 in FIG. 5a mounted on the Robotic right hand area 98. This feature may be applied to any task that requires a rotary motion in combination with a gripper to hold and rotate the object. Other applications include, Nut or Bolt loosening or tightening . . . etc.

in FIG. 11 a third embodiment of the present invention is shown, FIG. 11 illustrates a configuration of the Multifunction Robotic left hand which is primarily used for gripping and positioning of objects as depicted by 40 in FIG. 1. The palm is incorporated with an optional Camera 43 to enable fine alignment and tracking where required. It may also house a pedestal 44 (FIG. 11) in the palm area to hold and present a contact lens placed by the suction cup 92 in FIG. 5a of the Robotic Right hand Ring finger unit 95 in FIG. 5a, for the imaging system 18 in FIG. 1 to inspect it. Quality Inspection features may include but are not limited to defects such as tears, bubbles and contamination, dimensional measurements such as diameter, lens thickness and refractive power detection. The rubber pads at the tips of the finger units 41, 46, 47, 48 & 49 may include Hall effect sensors, Biometric sensors and other optional sensors as required by a specific process. The Robotic Right hand, the Robotic left hand working in close coordination with each other's capabilities, adds a very important capability in automating different processes, not realizable in related art.

In a fourth embodiment of the present invention a configuration that is capable of being implemented in the glass inspection industry is described. The Robotic left hand camera 43 in Fig 11 in coordination with the imaging system unit 18 in FIG. 1 of the Robotic Right hand, may be utilised to inspect a glass object (for example: a mobile phone screen or bezel glass) for defects and dimensions to determine if the glass is defective.

In a fifth embodiment of the present invention a configuration may be implemented in the Surgical accessories manufacturing, industry wherein accuracy and hygiene is particularly important and mandatory. Accessories may include but not limited to Cardiothoracic instruments, delicate microsurgical heart valves. . . etc. Post manufacturing the same set of Robots may be used to implement the quality assurance processes to inspect the manufactured products, before dispatch to customers.

In a sixth embodiment of the present invention a configuration may be implemented wherein the Robotic hands are adapted to read and interpret printed information on packages such as envelopes, boxes and containers for the purpose of sorting and binning them according to a predetermined set of rules. For eg. The Multifunction Robotic hands may be adaptable in the postal department and warehousing industry to sort and bin the packages according to their ZIP codes.

The Multifunction Robotic hands with built-in artificial intelligence, are capable of reconfiguring themselves by replacing an entire Robotic hand with a differently configured Robotic hand or to replace a specific set of Robotic finger units, without any human intervention. This feature enables the Robotic hands to scale and adapt themselves, whenever they are required to operate for a new application or if a modified process is required to be implemented in the same application. The interchangeability and interoperable functions that is achieved through standardised interface (22 in FIG. 5 and FIGS. 5*a* and 42 in FIG. 11) makes the Robotic hands reconfigurability simple, enabling quick and easy deployment in new processes under the same or different operating conditions, not possible in prior arts.

Figure 12:
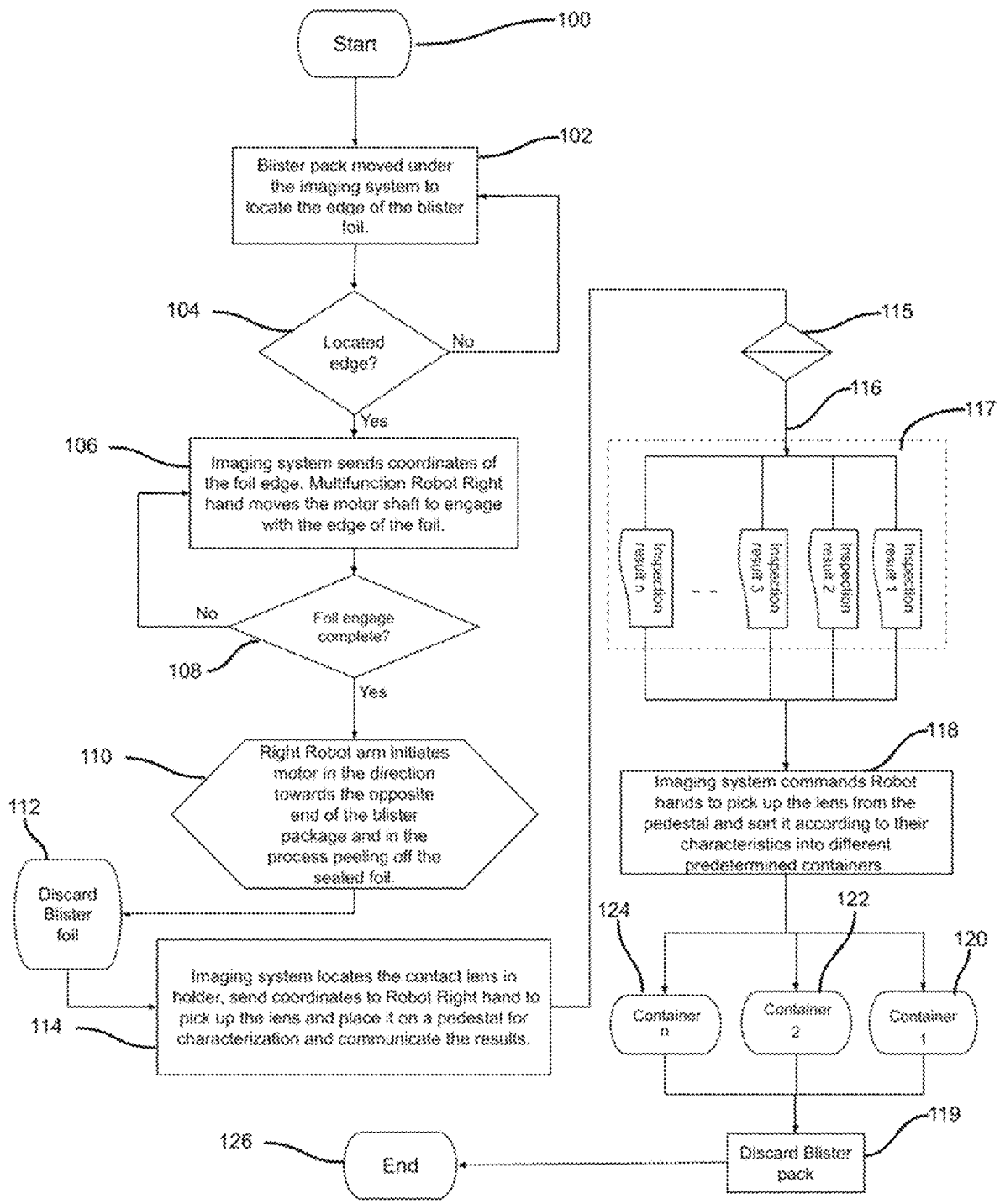
FIG. 12 shows a flow diagram showing the steps during the process of contact lens inspection and characterization according to the first embodiment.

Referring to FIG. 12, the flow of the process starts at 100 wherein a contact lens within a blister pack is to be removed and inspected. In Step 102, the blister pack 45 in FIG. 1 is presented under the imaging system 18 in FIG. 1, to identify the package outline and locate the edge of the blister foil 65 in FIG. 1. The positional information determined in Step 104 of FIG. 12 is communicated to the computer system (not shown) in Step 106 which instructs the Robotic Right hand 20 in FIG. 1 to engage the motor shaft 30 in FIG. 1 with the blister foil 65 in FIG. 1. At step 108 the foil engagement is complete. If not complete the process restarts at step 106 to retry the foil engagement process. In step 110 the motor 30 in FIG. 1 begins to rotate in the clockwise direction while simultaneously moving the motor assembly towards the backend of the blister, and in the process peeling the blister foil 65 in FIG. 1 until it is fully detached from the top side of the blister pack 50 in FIG. 1. In the next step 112 of the Robotic right hand, the blister foil is discarded and the Robotic Right hand moves to the next step 114. In step 114, the imaging system commands the Robotic Right hand to pick up the contact lens from the blister pack 50 in FIG. 1 and place it on a pedestal 44 in FIG. 11 for the imaging system 18 in FIG. 1 to inspect the lens. The imaging system characterises the contact lens based on a set of rules and communicates the results in step 115 to the Robotic Right hand which will then pick up the contact lens from the pedestal. The results are consolidated in step 115 and communicated at 116 after which sorting takes place in step 117. The contact lens is picked up from pedestal 44 in FIG. 11 and placed into different containers based on the decision in step 118 into containers 120-124. It is important to note that the number of categories of containers can vary based on the configuration of the Quality assurance system. The process ends at step 126 after discarding the empty blister in the Robotic left hand in step 119.

The unique design of the Multifunction Robotic hands and its associated finger units makes it possible to realize all possible actions and movements that include gripping, holding, cleaning, brushing, dosing, pickup and placement of an object, opening and closing a cap of multiple variety of containers, enable them for deployment not only in the quality inspection processes but also in manufacturing processes where accuracy, reliability, consistency and hygiene are of great importance.

Hereinbefore, the Multifunction Robotic hands according to the embodiments of the invention are described, but the invention is not limited to the above embodiments, and may include various modifications appropriately made in a range without departing from the spirit thereof.

The invention claimed is:

1. A toolable multifunction robotic hand comprising:
    a base structure or support section that is interchangeable and operatively connected to an external command interface through a standardised interface;
    at least five interchangeable finger units that are hermetically sealed and operatively connected through snap-on polarised connectors to the support section of the robotic hand;
    intelligently controlling said multifunction robotic hand through a communication interface using a plurality of commands to manipulate mechanical movements of said at least five finger units;
    a set of sensors including at least one of: pressure sensors, a temperature sensor or a displacement sensor integrated at tips of the at least five finger units;
    the at least five interchangeable finger units comprising:
        a thumb finger unit operatively connected to the support section to aid in gripping an object;
        a first or index finger unit operatively connected to the support section such that it is selectively rotatable with respect to the support section about its vertical axis;
        a second or middle finger unit operatively connected to the support section such that it functions as a cleaning unit;
        a third or ring finger unit operatively connected to the support section such that it functions as a pick and place mechanism to move objects;
        a fourth or little finger unit operatively connected to the support section such that it functions as a bidirectional rotating tool; and
    a bi-directional motor integrated with an encoder and operatively mounted on a palm or the support section of the robotic hand to enable certain tasks to be accomplished that require rotary movements,
        wherein the at least five interchangeable finger units are arranged to be operatively connected to the support section to selectively operate and thereby execute multiple tasks, wherein said at least five interchangeable finger units are configured such that one of said certain tasks are assigned to each one of the at least five interchangeable finger units which are independently controllable through a plurality of commands received from the standardised interface.

2. A toolable multifunction robotic hand of claim 1, wherein the thumb finger unit is suitably integrated with a pressure sensor within a rubber pad to enable feedback and control of a gripping force of the object.

3. A toolable multifunction robotic hand of claim 1, wherein the index finger unit is mounted with a cleaning brush on one side of a finger tip of the index finger unit and a rubber pad with a solution dispensing hole on the opposite side of the finger tip.

4. A toolable multifunction robotic hand of claim 1, wherein the middle finger unit is functionally mounted with a rubber pad on a finger tip of the middle finger unit in conjunction with a de-ionised air dispenser.

5. A toolable multifunction robotic hand of claim 4, wherein rubber pad is suitably integrated with the temperature sensor to control temperature of dispensed air.

6. A toolable multifunction robotic hand of claim 1, wherein the ring finger unit is functionally mounted with a suction cup to pick up objects from a predetermined location and place them at a different location.

7. A toolable multifunction robotic hand of claim 1, wherein the little finger unit is functionally integrated with a finger unit encoder coupled to a finger unit bi-directional motor, to aid in removing a foil covering of a sealed package to expose the object within.

8. A toolable multifunction robotic hand of claim 7, wherein positional information from the finger unit encoder is utilised to start and end a predetermined operation that involves bi-directional rotation, while engaging a work piece.

9. A toolable multifunction robotic hand of claim 1, wherein the bi-directional motor operatively mounted on the support section of the robotic hand is operatively integrated with a rotary gripper that is programmable to dynamically exert a gripping force around the object, irrespective of its diameter or profile to execute a predetermined rotary task.

10. A method for removing a sealed cover of a container held by at least two finger units of a multifunction robot hand, the method comprising:

locating a position of blister foil covering the container using an intelligent camera mounted on a support section of the robot hand;

moving the at least two finger units integrated with a motor to suitably engage with the blister foil;

moving said at least two finger units towards a predetermined position while simultaneously energising the motor to rotate in a direction that peels the blister foil from the container;

stopping the movement of said at least two finger units responsive to reaching a second predetermined position wherein the blister foil has been completely removed, exposing the flan object held in the container; and moving the at least two finger units to another position to dispose the blister foil.

11. A method as in claim 10, wherein the container is suitably positioned by the at least two finger units of the robotic hand with optimum gripping force with the aid of pressure sensors integrated in rubber pads positioned at fingertips of said at least two finger units.

12. A method for engaging a container held by at least two finger units of a multifunction robot hand to loosen or tighten a cap of a lithe container, the method comprising:

locating a position of the container cap using the flan intelligent camera mounted on a support section of the robot hand;

moving another multifunction robot hand to align a respective rotary gripper suitably mounted on a respective support section to engage with the container cap;

energising a rotary gripper and bi-directional motor in a direction to loosen or tighten the container cap; and repositioning the container to begin a next process step.

13. A method as in claim 12, wherein the bi-directional motor is suitably integrated with an encoder for positional feedback.

* * * * *